United States Patent
Anderson et al.

(10) Patent No.: US 11,392,316 B2
(45) Date of Patent: Jul. 19, 2022

(54) SYSTEM AND METHOD FOR PREDICATION HANDLING

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Joseph Zbiciak, San Jose, CA (US); Sahithi Krishna, Plano, TX (US); Soujanya Narnur, Austin, TX (US); Alan Davis, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/422,250

(22) Filed: May 24, 2019

(65) Prior Publication Data
US 2020/0371711 A1  Nov. 26, 2020

(51) Int. Cl.
*G06F 3/06* (2006.01)
*G06F 9/30* (2018.01)

(52) U.S. Cl.
CPC .......... *G06F 3/0659* (2013.01); *G06F 3/0604* (2013.01); *G06F 3/0673* (2013.01); *G06F 9/30043* (2013.01); *G06F 9/30098* (2013.01); *G06F 9/30145* (2013.01)

(58) Field of Classification Search
None
See application file for complete search history.

(56) References Cited

U.S. PATENT DOCUMENTS

| | | | | |
|---|---|---|---|---|
| 8,868,873 | B2* | 10/2014 | Shaeffer | G06F 3/0665 711/167 |
| 9,047,069 | B2* | 6/2015 | Bajenaru | G06F 9/30021 |
| 9,411,600 | B2* | 8/2016 | Anvin | G06F 12/0817 |
| 9,557,995 | B2* | 1/2017 | Eyole-Monono | G06F 9/30014 |
| 9,606,803 | B2* | 3/2017 | Anderson | G06F 9/30112 |
| 10,203,958 | B2* | 2/2019 | Zbiciak | G06F 9/3867 |
| 10,223,031 | B2* | 3/2019 | Ohwa | G06F 3/0659 |
| 11,157,278 | B2* | 10/2021 | Bhoria | G06F 16/9017 |
| 2005/0020223 | A1* | 1/2005 | Ellis | H04M 1/72522 455/186.1 |
| 2005/0027944 | A1* | 2/2005 | Williams | G06F 9/3816 711/137 |

(Continued)

FOREIGN PATENT DOCUMENTS

| | | | | |
|---|---|---|---|---|
| CN | 102307275 | A | * | 1/2012 |
| CN | 103777924 | A | * | 5/2014 ......... G06F 9/30018 |
| WO | WO-2018009919 | A1 | * | 1/2018 ......... G06F 9/3016 |

OTHER PUBLICATIONS

'Computer Architecture Lecture 8: Vector Processing (Chapter 4)' by Chih-Wei Liu, archived on Nov. 23, 2018. (Year: 2018).*

(Continued)

*Primary Examiner* — Steven G Snyder
(74) *Attorney, Agent, or Firm* — Brian D. Graham; Charles A. Brill; Frank D. Cimino

(57) ABSTRACT

A method for writing data to memory that provides for generation of a predicate to disable a portion of the elements so that only the enabled elements are written to memory. Such a method may be employed to write multi-dimensional data to memory and/or may be used with a streaming address generator.

20 Claims, 7 Drawing Sheets

(56) References Cited

U.S. PATENT DOCUMENTS

| | | | | |
|---|---|---|---|---|
| 2007/0106883 A1* | 5/2007 | Choquette | G06F 9/3816 | 712/225 |
| 2010/0268901 A1* | 10/2010 | Shaeffer | G06F 13/1694 | 711/155 |
| 2013/0007419 A1* | 1/2013 | Bajenaru | G06F 9/30036 | 712/220 |
| 2013/0125097 A1* | 5/2013 | Ebcioglu | G06F 30/30 | 717/136 |
| 2013/0215235 A1* | 8/2013 | Russell | H04N 13/243 | 348/47 |
| 2013/0297917 A1* | 11/2013 | Nguyen | G06F 11/3648 | 712/227 |
| 2015/0160998 A1* | 6/2015 | Anvin | G06F 12/1009 | 714/807 |
| 2015/0227367 A1* | 8/2015 | Eyole-Monono | G06F 9/30014 | 712/7 |
| 2016/0041872 A1* | 2/2016 | Ku | G06F 11/1052 | 714/764 |
| 2016/0283240 A1* | 9/2016 | Mishra | G06F 9/30018 | |
| 2017/0300271 A1* | 10/2017 | Ohwa | G06F 12/0207 | |
| 2018/0011707 A1* | 1/2018 | Zbiciak | G06F 9/3016 | |
| 2018/0011709 A1* | 1/2018 | Zbiciak | G06F 9/345 | |
| 2019/0205139 A1* | 7/2019 | Hughes | G06F 12/0875 | |
| 2019/0278595 A1* | 9/2019 | Tran | G06F 9/30145 | |
| 2020/0378757 A1* | 12/2020 | Kimura | G01B 9/02098 | |
| 2020/0379762 A1* | 12/2020 | Bhoria | G06F 9/44505 | |
| 2020/0379763 A1* | 12/2020 | Bhoria | G06F 9/3891 | |
| 2020/0380035 A1* | 12/2020 | Bhoria | G06F 9/44505 | |
| 2021/0042115 A1* | 2/2021 | Stephens | G06F 9/3824 | |
| 2021/0157585 A1* | 5/2021 | Anderson | G06F 9/345 | |

OTHER PUBLICATIONS

'Appendix G—Vector Processors' Revised by Krste Asanovic, copyright 2003, Elsevier Science has very similar teachings to the Liu NPL. (Year: 2003).*

'Modulo Calculator' by Bogna Haponiuk, archived on Mar. 12, 2019. (Year: 2019).*

* cited by examiner

FIG. 4

| 511 | 448 447 | 416 415 | 384 383 | 352 351 | 320 319 | 288 287 | 256 |
|---|---|---|---|---|---|---|---|
| FLAGS[63:0] | RESERVED | DIM5 | DIM4 | DIM3 | DIM2 | DIM1 | |

| 255 | 224 223 | 192 191 | 160 159 | 128 127 | 96 95 | 64 63 | 32 31 | 0 |
|---|---|---|---|---|---|---|---|---|
| DECDIM2_WIDTH | DECDIM1_WIDTH | ICNT5 | ICNT4 | ICNT3 | ICNT2 | ICNT1 | ICNT0 | |

FIG. 5

| 63 | 58 57 | 56 55 | 53 52 | 51 50 | 48 47 | 32 |
|---|---|---|---|---|---|---|
| RESERVED | DEC_DIM2SD | DEC_DIM2 | DEC_DIM1SD | DEC_DIM1 | RESERVED | |

| 31 | 27 26 | 24 23 | 15 14 | 12 11 | 0 |
|---|---|---|---|---|---|
| RESERVED | DIMFMT | RESERVED | VECLEN | RESERVED | |

FIG. 6

| 511 | 480 479 | 448 447 | 416 415 | 384 383 | 352 351 | 320 319 | 288 287 | 256 |
|---|---|---|---|---|---|---|---|---|
| DECDIM2_CNT | DECDIM1_CNT | CNT5 | CNT4 | CNT3 | CNT2 | CNT1 | CNT0 | |

| 255 | 224 223 | 192 191 | 160 159 | 128 127 | 96 95 | 64 63 | 32 31 | 0 |
|---|---|---|---|---|---|---|---|---|
| DECDIM2SD_CNT | DECDIM1SD_CNT | I5 OFFSET | I4 OFFSET | I3 OFFSET | I2 OFFSET | I1 OFFSET | CURRENT OFFSET | |

```
for (int i5 = 0; i5 < ICNT5; i5++) {                         45
    i5_offset = current_offset;
    for (int i4 = 0; i4 < ICNT4; i4++) {                     44
        i4_offset = current_offset;
        for (int i3 = 0; i3 < ICNT3; i3++) {                 43
            i3_offset = current_offset;
            for (int i2 = 0; i2 < ICNT2; i2++) {             42
                i2_offset = current_offset;
                for int i1 = 0; i1 < ICNT1; i1++) {          41
                    i1_offset = current_offset;
                    for (int i0 = 0; i0 < ICNT0; i0 += VECLEN) {
                        current_offset += VECLEN;
                        sa_offset = current_offset;          40
                        if ((ICNT0 - i0) < _VECLEN) {
                            pred = (1 << (ICNT0 - i0)) - 1;
                        } else {
                            pred = (1 << VECLEN) -1;}
                                                              46
                    }//end i0
                    current_offset = i1_offset + DIM1;
                }//end i1
                current_offset = i2_offset + DIM2;
            }//end i2
            current_offset = i3_offset + DIM3;
        }//end i3
        current_offset = i4_offset + DIM4;
    }//end i4
    current_offset = i5_offset + DIM5;
}//end i5
```

FIG. 7

SYSTEM AND METHOD FOR PREDICATION HANDLING

BACKGROUND

Modern digital signal processors (DSP) face multiple challenges. Workloads continue to increase, requiring increasing bandwidth. Systems on a chip (SOC) continue to grow in size and complexity. Memory system latency severely impacts certain classes of algorithms. As transistors get smaller, memories and registers become less reliable. As software stacks get larger, the number of potential interactions and errors becomes larger. Even conductive traces on circuit boards and conductive pathways on semiconductor dies become an increasing challenge. Wide busses are difficult to route. Signal propagation speeds through conductors continue to lag transistor speeds. Routing congestion is a continual challenge.

In many DSP algorithms, such as sorting, fast Fourier transform (FFT), video compression and computer vision, data are processed in terms of blocks. Therefore, the ability to generate both read and write access patterns in multi-dimensions is helpful to accelerate these algorithms.

SUMMARY

An example method for writing data to memory described herein comprises fetching a block of data comprising a plurality of elements and calculating a predicate to disable at least one of the elements to create a disabled portion of the block of data and to enable remainder of the elements to create an enabled portion. The method further comprises writing only the enabled portion of the block of data to memory.

An exemplary digital signal processor described herein comprises a CPU and a streaming address generator. The CPU is configured to fetch a block of data comprising a plurality of memory elements. The streaming address generator is configured to calculate a predicate to disable at least one of the elements to create a disabled portion of the block of data and to enable remainder of the elements to create an enabled portion. The CPU is configured to write only the enabled portion of the block of data to memory.

An exemplary digital signal processor system described herein comprises a memory and a digital signal processor. The digital signal processor comprises a CPU and a streaming address generator. The CPU is configured to fetch a block of data comprising a plurality of memory elements. The streaming address generator is configured to calculate a predicate to disable at least one of the elements to create a disabled portion of the block of data and to enable remainder of the elements to create an enabled portion. The CPU is configured to write only the enabled portion of the block of data to memory.

BRIEF DESCRIPTION OF THE DRAWINGS

For a detailed description of various examples, reference will now be made to the accompanying drawings in which:

FIG. 4 illustrates an exemplary streaming address configuration register;

FIG. 5 illustrates exemplary sub-field definitions of the flags field of the streaming address configuration register of FIG. 4;

FIG. 6 illustrates an exemplary streaming address count register;

FIG. 7 illustrates exemplary logic used by the streaming address generator;

DETAILED DESCRIPTION

Examples provided herein show implementations of vector predication, which provides a mechanism for ignoring portions of a vector in certain operations, such as vector predicated stores. Such a feature is particularly, though not exclusively, useful in the multidimensional addressing discussed in a U.S. Patent Application entitled, "Streaming Address Generation" (hereinafter "the Streaming Address Generation application"), filed concurrently herewith, and incorporated by reference herein.

Figure 1:
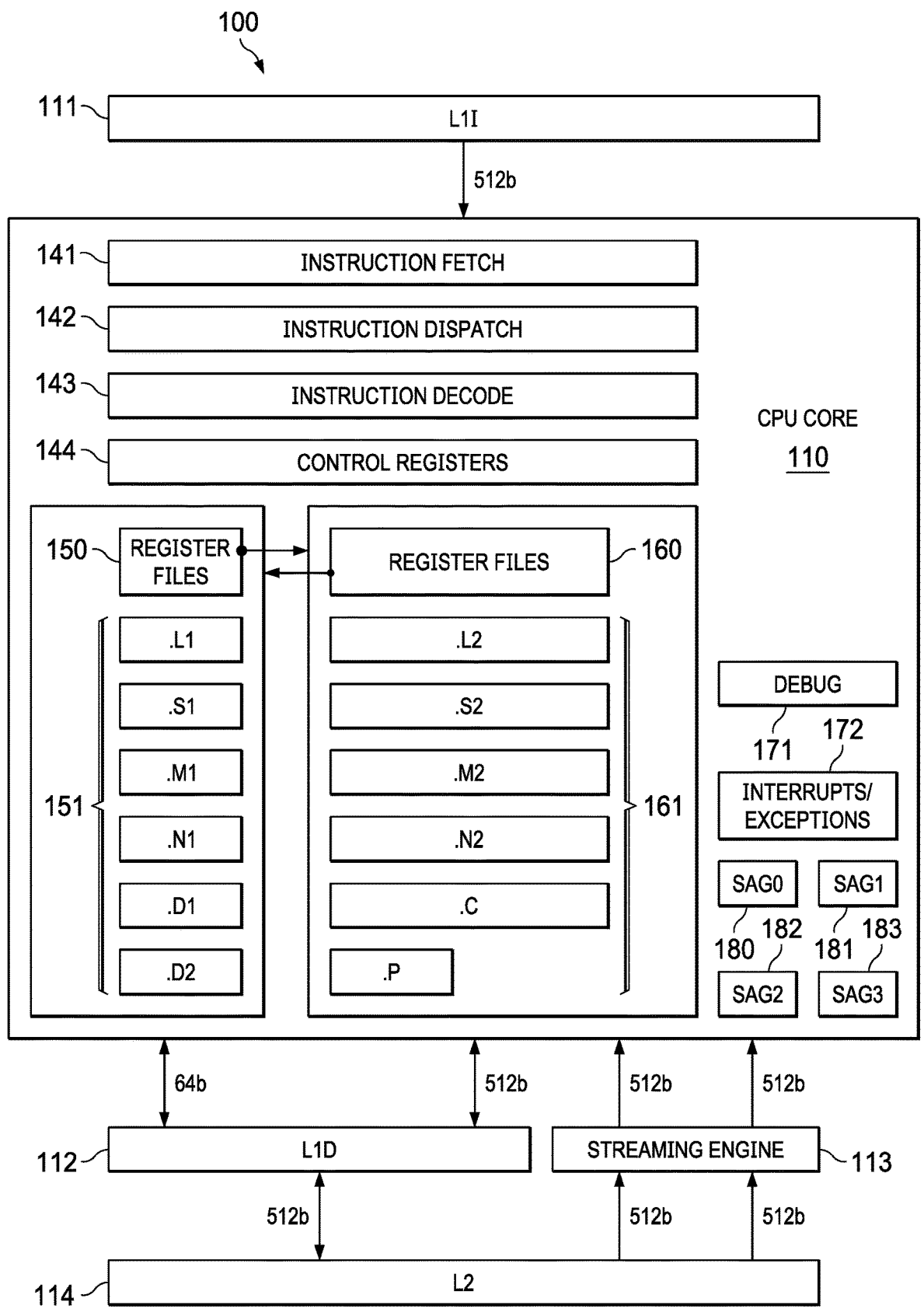
FIG. 1 illustrates a DSP according to examples described herein.

FIG. 1 illustrates a block diagram of at least a portion of DSP 100 having vector CPU 110. As shown in FIG. 1, vector CPU 110 includes instruction fetch unit 141, instruction dispatch unit 142, instruction decode unit 143, and control registers 144. Vector CPU 110 further includes 64-bit register files 150 and 64-bit functional units 151 for receiving and processing 64-bit scalar data from level one data cache (L1D) 112. Vector CPU 110 also includes 512-bit register files 160 and 512-bit functional units 161 for receiving and processing 512-bit vector data from level one data cache (L1D) 112 and/or from streaming engine 113. DSP 100 also includes level two combined instruction/data cache (L2) 114, which sends and receives data from level one data cache (L1D) 112 and sends data to streaming engine 113. Vector CPU 110 may also include debug unit 171 and interrupt logic unit 172.

DSP 100 also includes streaming engine 113. As described in U.S. Pat. No. 9,606,803 (hereinafter "the '803 patent"), incorporated by reference herein in its entirety, a streaming engine such as streaming engine 113 may increase the available bandwidth to the CPU, reduces the number of cache misses, reduces scalar operations and allows for multi-dimensional memory access. DSP 100 also includes, in the vector CPU 110, streaming address generators SAG0 180, SAG1 181, SAG2 182, SAG3 183. As described in more detail in the Streaming Address Generation application, the streaming address generators SAG0 180, SAG1 181, SAG2 182, SAG3 183 generate offsets for addressing streaming data, and particularly for multi-dimensional streaming data. While FIG. 1 shows four streaming address generators, as described in the concurrently filed application, there may one, two, three or four streaming address generators and, in other examples, more than four. Streaming address generators SAG0 180, SAG1 181, SAG2 182, SAG3 183 also handle predication.

Figure 2:
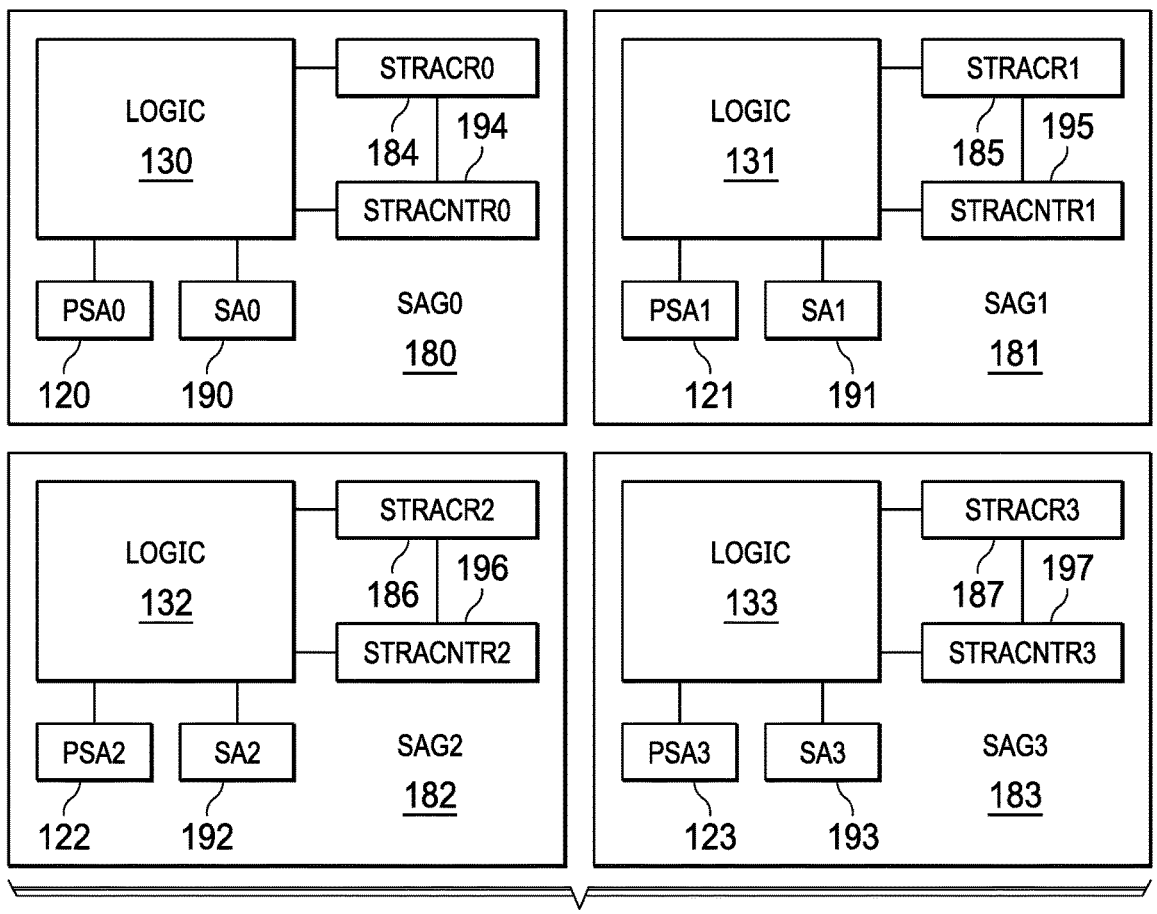
FIG. 2 illustrates streaming address generators according to examples described herein.

FIG. 2 shows the streaming address generators SAG0 180, SAG1 181, SAG2 182, SAG3 183, in more detail. Each streaming address generator SAG0 180, SAG1 181, SAG2 182, SAG3 183 includes respective logic 130, 131, 132, 133 for performing the offset generation and predication. Logic 130, 131, 132, 133 implements the logic for generating offsets and predicates using hardware. Offsets generated by streaming address generators 180, 181, 182, 183 are stored in streaming address offset registers SA0 190, SA1 191, SA2 192 and SA3 193, respectively.

Figure 3:
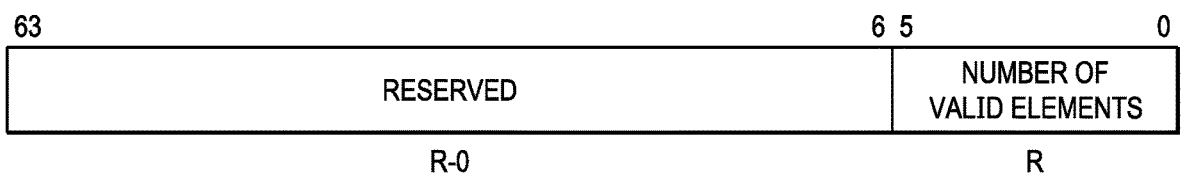
FIG. 3 illustrates an exemplary predicate streaming address register.

Each streaming address generator SAG0 180, SAG1 181, SAG2 182, SAG3 183 also includes predicate streaming address registers PSA0 120, PSA1 121, PSA2 122, PSA3 123. FIG. 3 illustrates an exemplary predicate streaming address register. Predicate streaming address registers PSA0 120, PSA1 121, PSA2 122, PSA3 123 store predicate information generated during the offset generation described in the Streaming Address Generation application. When a streaming store instruction is executed, the vector predicate value from the corresponding predicate streaming address register may be read and is converted to byte enables. Bytes that are not enabled are not written, while the other bytes are written to memory (e.g., L1D 112 or L2 114). The predicate may be converted into byte enables by shifting the bits left.

The streaming address predicates may be generated every time a new stream is opened (SAOPEN), which described in more detail in the Streaming Address Generator application, or when a streaming load or store instruction with advancement (SA0++/SA1++/SA2++/SA3++) is executed, which described in more detail in the Streaming Address Generator and a U.S. Patent Application entitled, "System and Method for Addressing Data in Memory," filed concurrently herewith, and incorporated by reference herein.

Each streaming address generator SAG0 180, SAG1 181, SAG2 182, SAG3 183 also includes a respective streaming address control register STRACR0 184, STRACR1 185, STRACR2 186, STRACR3 187 and a respective streaming address count register STRACNTR0 194, STRACNTR1 195, STRACNTR2 196, STRACNTR3 197. As explained in more detail below, the streaming address control registers STRACR0 184, STRACR1 185, STRACR2 186, STRACR3 187 contain configuration information for the respective streaming address generator for offset generation and predication, and the streaming address count registers STRACNTR3 197 store runtime information used by the respective streaminSTRACNTR0 194, STRACNTR1 195, STRACNTR2 196, g address generator.

FIG. 4 illustrates an exemplary streaming address configuration register. Table 2 shows an example of the field definitions of the streaming address configuration register.

TABLE 1

| Field Name | Description | Size Bits |
| --- | --- | --- |
| ICNT0 | Number of iterations for the innermost loop level 0. At loop level 0, all elements are physically contiguous. DIM0 = 1. In Data Strip Mining Mode, ICNT0 is used as the initial total "actual width" of the frame. | 32 |
| ICNT1 | Total loop iteration count for level 1 | 32 |
| ICNT2 | Total loop iteration count for level 2 | 32 |
| ICNT3 | Total loop iteration count for level 3 | 32 |
| ICNT4 | Total loop iteration count for level 4 | 32 |
| ICNT5 | Total loop iteration count for level 5 | 32 |
| DECDIM1_WIDTH | Tile width of DEC_DIM1. Use together with DEC_DIM1 flags to specify vertical strip mining feature | 32 |
| DECDIM2_WIDTH | Tile width of DEC_DIM2. Use together with DEC_DIM2 flags to specify vertical strip mining feature | 32 |
| DIM1 | Number of elements between consecutive iterations of loop level 1 | 32 |
| DIM2 | Number of elements between consecutive iterations of loop level 2 | 32 |
| DIM3 | Number of elements between consecutive iterations of loop level 3 | 32 |
| DIM4 | Number of elements between consecutive iterations of loop level 4 | 32 |
| DIM5 | Number of elements between consecutive iterations of loop level 5 | 32 |
| FLAGS | Stream modifier flags | 64 |

The iteration count ICNT0, ICNT1, ICNT2, ICNT3, ICNT4, ICNT5 for a loop level indicates the total number of iterations in a level. Though, as described below, the number of iterations of loop 0 does not depend only on the value of ICNT0. The dimension DIM0, DIM1, DIM2, DIM3, DIM4, DIM5, indicates the distance between pointer positions for consecutive iterations of the respective loop level. DECDIM1_WIDTH and DECDIM2_WIDTH define, in conjunction with other parameters in the FLAGS field, any vertical strip mining—i.e., any portions of the memory pattern that will not be written.

FIG. 5 illustrates exemplary sub-field definitions of the flags field of a streaming address configuration register. VECLEN specifies the number of elements per fetch. DEC_DIM1 and DEC_DIM2 define the dimension or loop (as described below) to which the vertical strip mining of DECDIM1_WIDTH and DECDIM2_WIDTH, respectively, apply. DEC_DIM1SD and DEC_DIM2SD, like DEC_DIM1 and DEC_DIM2, define an additional dimension or loop to which each of DECDIM1_WIDTH and DECDIM2_WIDTH may apply, thereby allowing for the definition of multidimensional-dimensional data exclusion. DIMFMT defines the number of dimensions in the stream.

The streaming address count registers STRACNTR0 194, STRACNTR1 195, STRACNTR2 196, STRACNTR3 197 contain the intermediate element counts of all loop levels. FIG. 6 illustrates an exemplary streaming address count register. CNT5, CNT4, CNT3, CNT2, CNT1 and CNT0 represent the intermediate element counts for each respective loop level. When the element count CNTX of loop X becomes zero, assuming that the loop counts are decremented and not incremented, the address of the element of the next loop is computed using the next loop dimension. The streaming address count registers STRACNTR0 194, STRACNTR1 195, STRACNTR2 196, STRACNTR3 197 also contain intermediate counts for the DEC_DIM calculations described below.

The streaming address generators SAG0 380, SAG1 381, SAG2 382, SAG3 383 use multi-level nested loops implemented in logic 130, 131, 132, 133, to iteratively generate offsets for multi-dimensional data and to generate predicate information using a small number of parameters defined, primarily in the streaming address control registers 184, 185, 186, 187.

FIG. 7 shows exemplary logic used by the streaming address generator for calculating the offsets for a 6-level forward loop. The logic of FIG. 7 is implemented in hardware in the logic 130, 131, 132, 133 of the respective streaming address generator.

In the example logic in FIG. 7, the innermost loop 40 (referred to as loop 0) computes the offsets of physically contiguous elements from memory. Because the elements are contiguous and have no space between them, the dimension of loop 0 is always 1 element, so there may be no dimension (DIM) parameter defined for loop 0. The pointer itself moves from element to element in consecutive, increasing order. In each level outside the inner loop (41, 42, 43, 44, 45), the loop moves the pointer to a new location based on the size of that loop level's dimension (DIM). The inner most loop 40 also includes exemplary predication logic 46.

There are generally two different types of predication. The first type of predication is implicit in streaming store instructions. In the inner most loop 40, the streaming address generator will disable any bytes greater than CNT0 (which is represented as i0 in FIG. 7) if CNT0≤VECLEN. Said another way, if a streaming store has fewer elements than the current iteration count of the inner most loop (CNT0), the upper predicate bits may be ignored. If a streaming store has more elements than CNT0, the upper predicate bits are implicit 0. A predicate may also be applied when CNT0 is saturated at zero or when CNT0 is reloaded from the template ICNT0 when the count of the dimension specified by DEC_DIM or higher is reloaded.

The CPU may be configured to look at the predicate streaming address register PSA0 120, PSA1 121, PSA2 122, PSA3 123 when executing any streaming store instruction. Alternatively, the appropriate predicate streaming address register PSA0 120, PSA1 121, PSA2 122, PSA3 123 may be one of the operands for the streaming store instruction. The streaming store instruction may look only at the LSBs of the corresponding predicate streaming address register PSA0 120, PSA1 121, PSA2 122, PSA3 123. The streaming store instruction may translate the value of the predicate streaming address register PSA0 120, PSA1 121, PSA2 122, PSA3 123 to byte enables as necessary according to the element type specified by the store instruction. One example of such translation is the bit shifting performed in the inner loop 40 of FIG. 7. For streaming store instructions, the byte enables are packed in the same way as the store data.

The second type of predication may be referred to as strip mining, and allows the user to disable writing of data in one or more dimensions by using the DEC_DIM parameters discussed above. Strip mining is discussed in the following applications filed on May 23, 2019, each of which is incorporated by reference herein in its entirety: application Ser. No. 16/420,480, entitled "Inserting Predefined Pad Values into a Stream of Vectors," application Ser. No. 16/420,467, entitled "Inserting Null Vectors into a Stream of Vectors," application Ser. No. 16/420,457, entitled "Two-Dimensional Zero Padding in a Stream of Matrix Elements," and application Ser. No. 16/420,447, entitled "One-Dimensional Zero Padding in a Stream of Matrix Elements."

Figure 8:
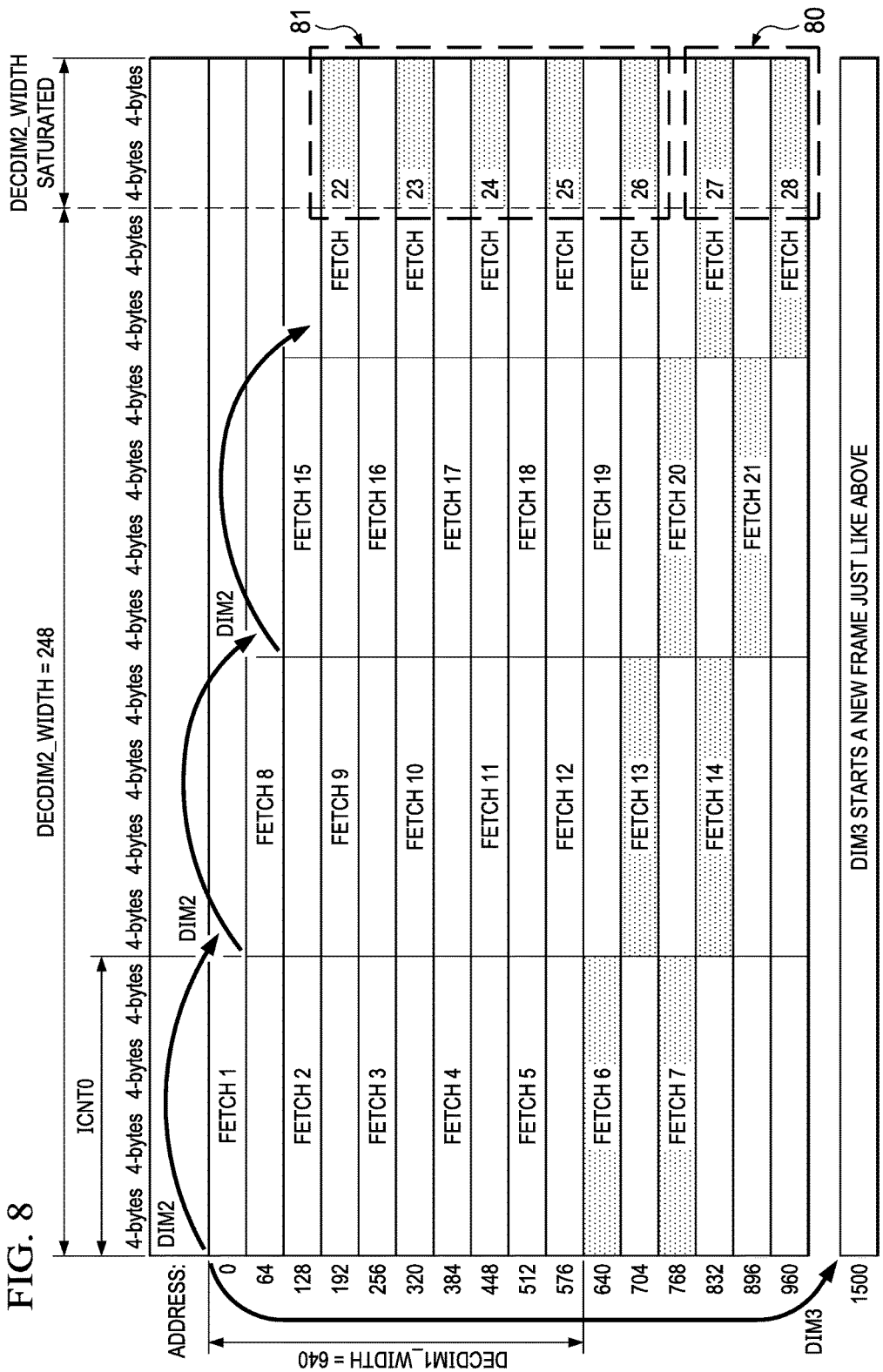
FIG. 8 illustrates an exemplary 6-dimensional memory pattern.

FIG. 8 shows an example memory pattern that includes strip mining. The following parameter values are used for the memory pattern shown in FIG. 8:

VECLEN=16-elems
DIMFMT=6
ICNT0=16
ICNT1=7
ICNT2=4
ICNT3=2
ICNT4=1
ICNT5=1
DIM1=128
DIM2=80
DIM3=1500
DIM4=0
DIM5=0
DEC_DIM1=001
DECDIM1_WIDTH=640
DEC_DIM2=010
DECDIM2_WIDTH=248

As shown in FIG. 8, because DEC_DIM1 is 1, all bytes after the DECDIM1_WIDTH of 640 in loop 1 are disabled because the DECDIM1_WIDTH is saturated. Similarly, because DEC_DIM2 is 2 (binary 010), all bytes after the DECDIM2_WIDTH of 248 in loop 2 are disabled because the DECDIM2_WIDTH is saturated. To determine saturation, for each iteration of the respective loop, the respective DECDIM_WIDTH value is decremented by the respective DIM value. When that counter reaches 0, no additional bytes are written in the respective dimension. In the example in FIG. 8, DIM2=80, and ICNT2=4. The first 3 iterations of loop 2 were written without predication, but reduced the DECDIM2_WIDTH count to 8 (after having DIM2=80 decremented three times). As such, the only 8 elements (in this case bytes) were written in the fourth loop, leaving the remaining bytes as masked data 81. The masked data 80 is masked by both DEC_DIM1 and DEC_DIM2 as it is the intersection of the masked data for both of those dimensions.

Figure 9A:
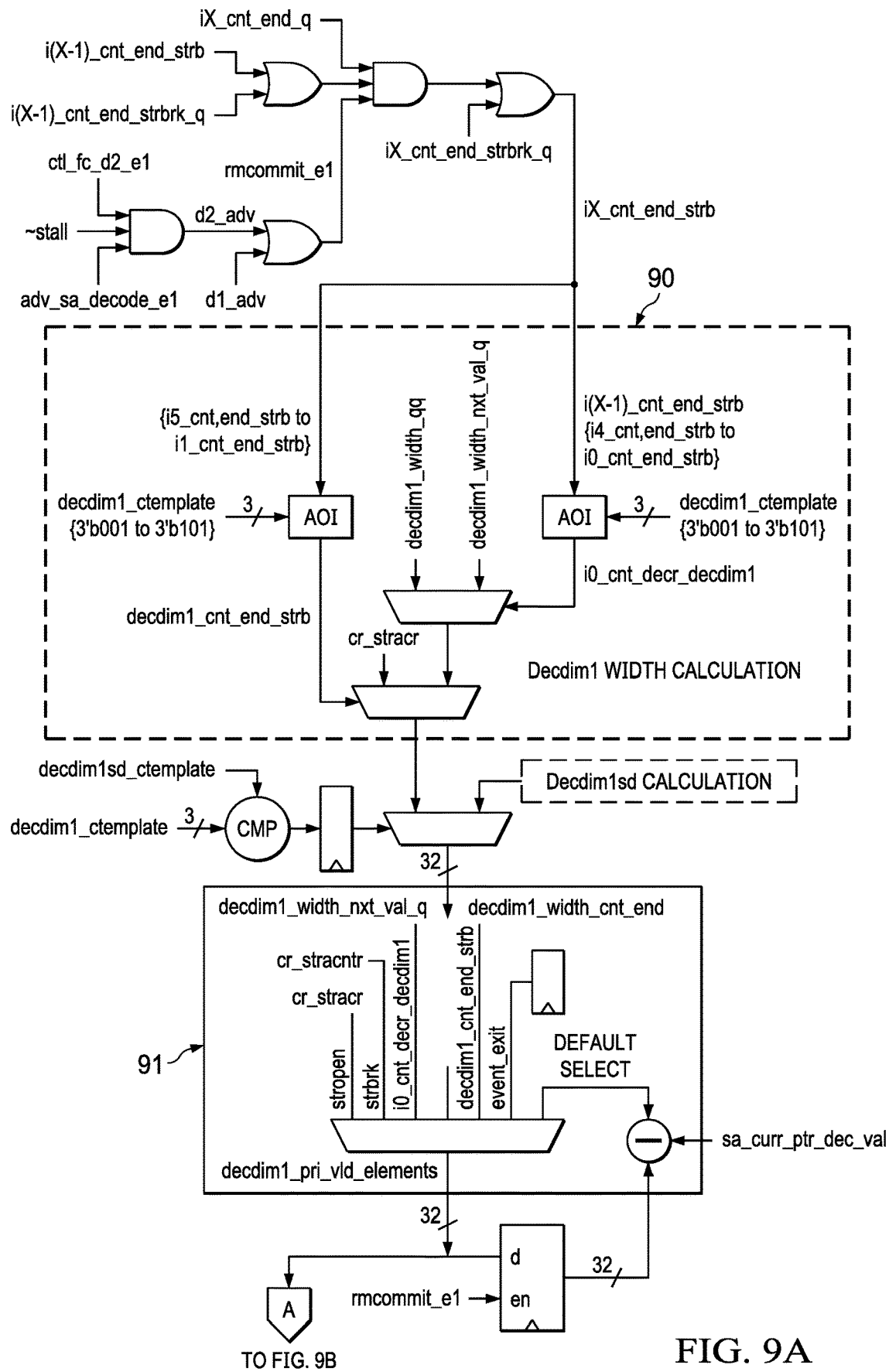
FIGS. 9A and 9B illustrate a hardware diagram of an exemplary implementation of the predication generation functionality of the streaming address generator.
Figure 9B:
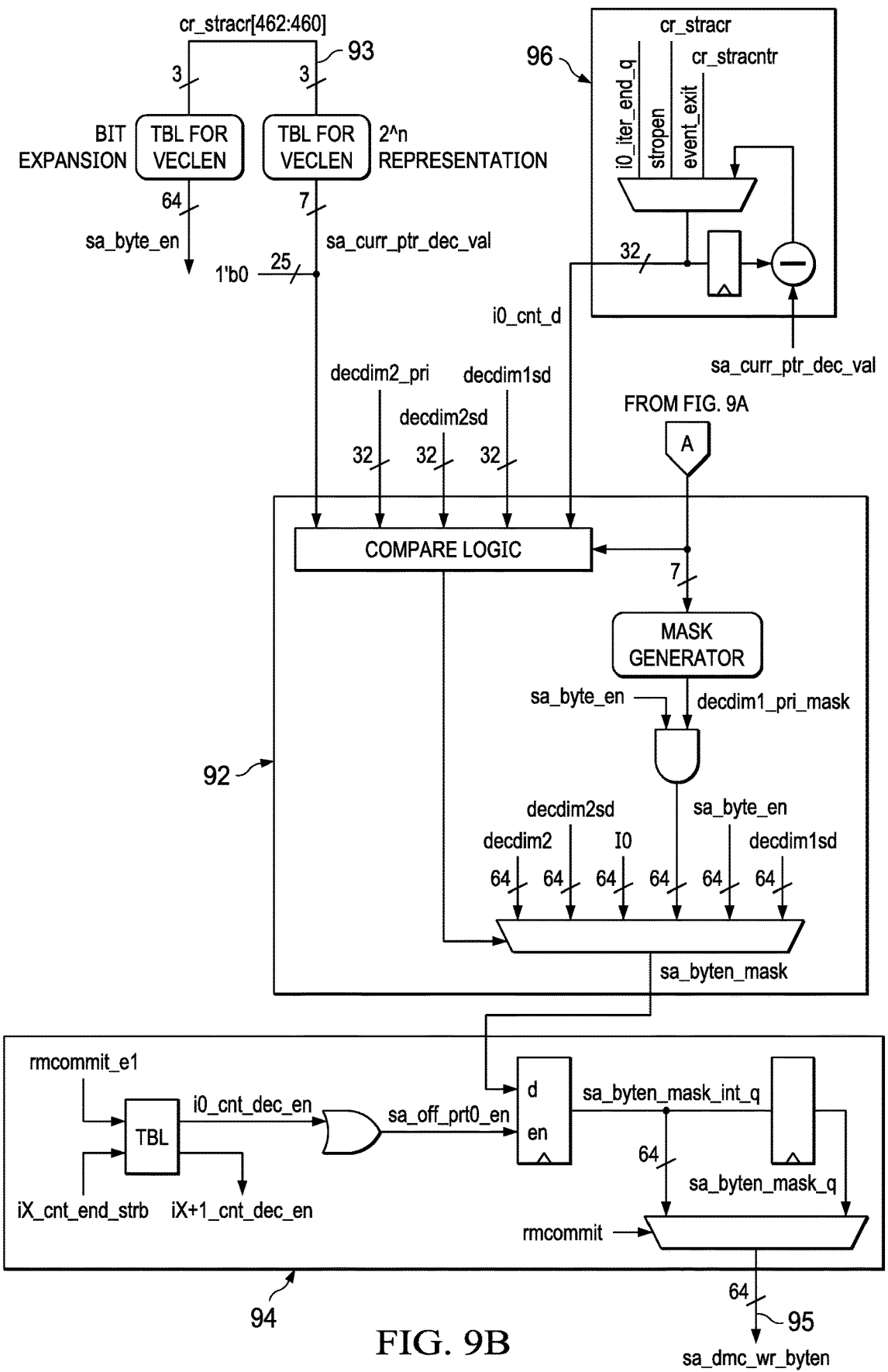

FIGS. 9A and 9B show an exemplary hardware diagram for the portion of the respective streaming address generator 180, 181, 182, 183 used for predication generation. In block 90, the streaming address generator decrements DECDIM1_WIDTH by DIM1. In block 91, the streaming address generator determines how many elements remain for writing in DEC_DIM1 after decrementing DECDIM1_WIDTH. Block 96 controls the looping and iterations. Block 92 receives all predication generated by DECDIM1, DEC_DIM2, DEC_DIM1SD, DEC_DIM2SD. Block 92 also receives at 93 any predication required based on the implicit predication described above. Based on these inputs, block 92 determines an aggregate masking of bytes. In block 94, the masking is generated and output at 95.

Predicates may fill the least significant bits (LSBs) of the associated predicate registers. The predicate is "element wise" for the next VECLEN elements (where VECLEN is power of 2 from 1 to 64).

Vector predication may be used with vector predicated store instructions, which optionally include the appropriate predicate streaming address register PSA0, PSA1, PSA2, PSA3, as an operand. Vector predication may also be used with regular vector store instructions, which may access predicate information from a different predicate register, for example, a predicate register in the .P functional unit of functional units 161 of FIG. 1. In this case, the value of the appropriate predicate streaming address register PSA0, PSA1, PSA2, PSA3 may be first moved to the predicate register in the .P functional unit of functional units 161.

The predicate streaming address registers PSA0 120, PSA1 121, PSA2 122, PSA3 123 may also store comparisons between vectors or can determine from which of two vectors a particular byte should be written. Predicate streaming address register PSA0 120, PSA1 121, PSA2 122, PSA3 123 may be applied for scalar or vector streaming store instructions. Scalar predication may also be used with streaming load and store instructions. For example, the offset may only increment when the scalar predication is true.

Modifications are possible in the described embodiments, and other embodiments are possible, within the scope of the claims.

What is claimed is:

1. A method for writing data to a memory, the method comprising:
   for a first iteration of a first loop in a first dimension, fetching a first block of data comprising a plurality of elements based on a pointer value;
   determining that a first width parameter for the first loop is not saturated;
   advancing the pointer value by a first dimension value for the first loop after fetching the first block of data;
   advancing the first width parameter after determining that the first width parameter is not saturated;
   writing the first block of data to the memory in response to determining that the first width parameter is not saturated;
   for a second iteration of the first loop, fetching a second block of data based on the pointer value;
   determining that the first width parameter is partially saturated after advancing the first width parameter;
   disabling a first portion of the second block of data in response to determining that the first width parameter is partially saturated;
   enabling a second portion of the second block of data in response to determining that the first width parameter is partially saturated; and
   writing only the second portion of the second block of data to the memory.

2. The method of claim 1, wherein a step of determining whether the first width parameter is saturated occurs when a stream is opened.

3. The method of claim 1, wherein a step of determining whether the first width parameter is saturated occurs for any streaming load or store instructions that advance a streaming address register.

4. A digital signal processor comprising:
   a CPU configured to:
      for a first iteration of a first loop in a first dimension, fetch a first block of data comprising a plurality of memory elements based on a pointer value; and
      for a second iteration of the first loop, fetch a second block of data based on the pointer value; and
   a streaming address generator configured to:
      determine that a first width parameter for the first loop is not saturated;
      advance the pointer value by a first dimension value for the first loop after fetching the first block of data;
      advance the first width parameter after determining that the first width parameter is not saturated;
      determine that the first width parameter is partially saturated after advancing the first width parameter;
      disable a first portion of the second block of data in response to determining that the first width parameter is partially saturated; and
      enable a second portion of the second block of data in response to determining that the first width parameter is partially saturated,
   wherein the CPU is configured to:
      write the first block of data to a memory in response to determining that the first width parameter is not saturated; and
      write only the second portion of the second block of data to the memory.

5. The digital signal processor of claim 4, wherein the streaming address generator is configured to determine whether the first width parameter is saturated when a stream is opened.

6. The digital signal processor of claim 4, wherein the streaming address generator is configured to determine whether the first width parameter is saturated for any streaming load or store instructions that advance a streaming address register.

7. A digital signal processor system comprising:
   a memory; and
   a digital signal processor for reading from and writing to the memory, the digital signal processor comprising:
      a CPU configured to:
         for a first iteration of a first loop in a first dimension, fetch a first block of data comprising a plurality of memory elements based on a pointer value; and
         for a second iteration of the first loop, fetch a second block of data based on the pointer value; and
      a streaming address generator configured to:
         determine that a first width parameter for the first loop is not saturated;
         advance the pointer value by a first dimension value for the first loop after fetching the first block of data;
         advance the first width parameter after determining that the first width parameter is not saturated;
         determine that the first width parameter is partially saturated after advancing the first width parameter;
         disable a first portion of the second block of data in response to determining that the first width parameter is partially saturated; and
         enable a second portion of the second block of data in response to determining that the first width parameter is partially saturated,
      wherein the CPU is configured to:
         write the first block of data to the memory in response to determining that the first width parameter is not saturated; and
         write only the second portion of the second block of data to the memory.

8. The digital signal processor system of claim 7, wherein the streaming address generator is configured to determine whether the first width parameter is saturated when a stream is opened.

9. The digital signal processor system of claim 7, wherein the streaming address generator is configured to determine whether the first width parameter is saturated for any streaming load or store instructions that advance a streaming address register.

10. The method of claim 1, wherein determining that the first width parameter is partially saturated comprises determining that a length of the second block of data is greater than the first width parameter after advancing the first width parameter.

11. The method of claim 1, further comprising:
advancing the pointer value by the first dimension value after fetching the second block of data;
advancing the first width parameter by the first dimension value after determining that the first width parameter is partially saturated;
for a third iteration of the first loop, fetching a third block of data based on the pointer value;
determining that the first width parameter is fully saturated;
disabling all of the third block of data in response to determining that the first width parameter is fully saturated; and
refraining from writing the third block of data to the memory.

12. The method of claim 1, wherein fetching the first block of data is also for a first iteration of a second loop in a second dimension, the method further comprising:
determining that an iteration count for the first loop has reached a threshold value after writing the second portion of the second block of data to the memory;
resetting the first width parameter after determining that the iteration count for the first loop has reached the threshold value;
resetting the pointer value after determining that the iteration count for the first loop has reached the threshold value;
advancing the pointer value by a second dimension value after resetting the pointer value; and
for the first iteration of the first loop, and for a second iteration of the second loop, fetching a third block of data based on the pointer value.

13. The method of claim 12, further comprising:
advancing a second width parameter by the second dimension value after determining that the iteration count for the first loop has reached the threshold value;
determining that the second width parameter is partially saturated after advancing the second width parameter;
disabling a first portion of the third block of data in response to determining that the second width parameter is partially saturated;
enabling a second portion of the third block of data in response to determining that the second width parameter is partially saturated; and
writing only the second portion of the third block of data to the memory.

14. The method of claim 13, further comprising:
advancing the pointer value by the first dimension value after fetching the third block of data;
advancing the first width parameter by the first dimension value after resetting the first width parameter;
for the second iteration of the first loop, and for the second iteration of the second loop, fetching a fourth block of data based on the pointer value;
determining that the first width parameter is partially saturated after advancing the first width parameter;
disabling a first portion of the fourth block of data in response to determining that the first width parameter is partially saturated;
disabling a second portion of the fourth block of data in response to determining that the second width parameter is partially saturated;
enabling a third portion of the fourth block of data in response to determining that the first and second width parameters are partially saturated; and
writing only the third portion of the fourth block of data to the memory.

15. The digital signal processor of claim 4, wherein to determine that the first width parameter is partially saturated, the streaming address generator is configured to determine that a length of the second block of data is greater than the first width parameter after advancing the first width parameter.

16. The digital signal processor of claim 4,
wherein the CPU is configured to fetch, for a third iteration of the first loop, a third block of data based on the pointer value, and
wherein the streaming address generator is configured to:
advance the pointer value by the first dimension value after fetching the second block of data;
advance the first width parameter by the first dimension value after determining that the first width parameter is partially saturated;
determine that the first width parameter is fully saturated; and
disable all of the third block of data in response to determining that the first width parameter is fully saturated,
wherein the CPU is configured to refrain from writing the third block of data to the memory.

17. The digital signal processor of claim 4,
wherein the CPU is configured to fetch the first block of data for a first iteration of a second loop in a second dimension, and
wherein the streaming address generator is configured to:
determine that an iteration count for the first loop has reached a threshold value after writing the second portion of the second block of data to the memory;
reset the first width parameter after determining that the iteration count for the first loop has reached the threshold value;
reset the pointer value after determining that the iteration count for the first loop has reached the threshold value; and
advance the pointer value by a second dimension value after resetting the pointer value,
wherein the CPU is configured to fetch, for the first iteration of the first loop, and for a second iteration of the second loop, a third block of data based on the pointer value.

18. The digital signal processor of claim 17, wherein the streaming address generator is configured to:
advance a second width parameter by the second dimension value after determining that the iteration count for the first loop has reached the threshold value;
determine that the second width parameter is partially saturated after advancing the second width parameter;
disable a first portion of the third block of data in response to determining that the second width parameter is partially saturated; and
enable a second portion of the third block of data in response to determining that the second width parameter is partially saturated,
wherein the CPU is configured to write only the second portion of the third block of data to the memory.

19. The digital signal processor of claim 18,
wherein the CPU is configured to fetch, for the second iteration of the first loop, and for the second iteration of the second loop, a fourth block of data based on the pointer value, and
wherein the streaming address generator is configured to:
  advance the pointer value by the first dimension value after fetching the third block of data;
  advance the first width parameter by the first dimension value after resetting the first width parameter;
  determine that the first width parameter is partially saturated after advancing the first width parameter;
  disable a first portion of the fourth block of data in response to determining that the first width parameter is partially saturated;
  disable a second portion of the fourth block of data in response to determining that the second width parameter is partially saturated; and
  enable a third portion of the fourth block of data in response to determining that the first and second width parameters are partially saturated,
  wherein the CPU is configured to write only the third portion of the fourth block of data to the memory.

20. The method of claim 1, wherein determining that the first width parameter is partially saturated comprises determining that a length of the second block of data causes the first width parameter to be exceeded.

* * * * *